UNITED STATES PATENT OFFICE.

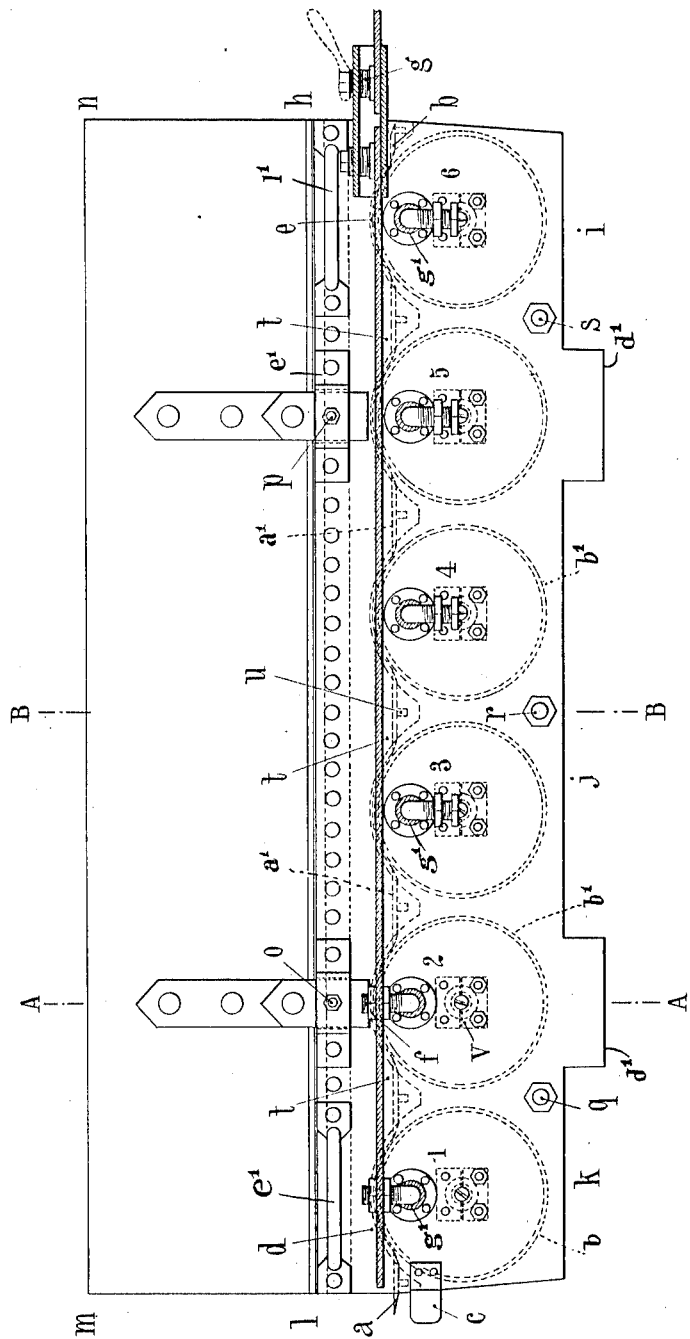

EDWIN A. HOWE, OF BANCROFT, IOWA.

AUTOMOBILE-TIRE.

1,079,175.  Specification of Letters Patent. Patented Nov. 18, 1913.

Application filed February 21, 1913. Serial No. 749,989.

*To all whom it may concern:*

Be it known that I, EDWIN A. HOWE, a citizen of the United States, residing at Bancroft, in the county of Kossuth, State of Iowa, have invented certain new and useful Improvements in Automobile-Tires; and I do hereby declare the following to be a full, clear, and exact description of the invention, such as will enable others skilled in the art to which it appertains to make and use the same.

This invention relates to improvements in tires, and particularly to cushion tires.

One object of the invention is to provide a cushion tire as a whole, which can be easily applied to the ordinary automobile wheel rim.

Another object resides in the peculiar construction and arrangement of parts to produce resiliency and to protect the parts from dirt and dust.

Other objects and advantages will be apparent from the following description when taken in connection with the accompanying drawings.

In the drawings: Figure 1 is an elevation of a portion of a tire made in accordance with my invention. Fig. 2 is a vertical longitudinal sectional view therethrough. Fig. 3 is a vertical transverse sectional view on the line 3—3 of Fig. 2 and Fig. 4 is a detail view of the connection of the outer rim.

Referring particularly to the accompanying drawings, 10 represents the inner or rim engaging band, which is formed preferably of two sections attached together, and formed with the upturned ends 11 which are secured together by means of the bolts 12, these sections being preferably in the form of channels, said sections being secured to the rim 13 by means of the bolts 14. Arranged outside of the rim engaging band 10 and concentric therewith is a band 15, this band being made up of a plurality of sections 16. Formed on the abutting ends of the sections 16 are the tongues 17 which are bent back on the sections to form loops, and are adapted to receive one end of a coil spring 18, the opposite end of which is bolted to the inner rim member 10. There are a plurality of these springs 18, which are arranged at the joints between the members 16. Thus a portion of the spring forms a part of the hinge, the free end of the spring being formed with threads to receive a nut 19. On the inner faces of the sections 16 and on the outer face of the inner band 10 are arranged loop members 20 through which are passed wire hoops 21, these hoops having secured thereto, by their marginal edges, the fabric guards 22, these being arranged on opposite sides of the tire and covering the spaces between inner rim 10 and the outer rim 15 to prevent dust and dirt entering between the rims. Mounted on the outer face of the rim 15 is a continuous metal band 23 provided with a plurality of points 24 to prevent skidding. The band 23 has flanges 25 on its edges for engagement with the sides of the outer rim 15 to prevent the same moving laterally on the said rim.

What is claimed is:

A cushion tire comprising a rim engaging band, a band arranged concentrically outward of the rim engaging band, said outer band being formed in sections, perforated lugs carried by the adjacent ends of the sections of the outer band, coil springs secured to the rim engaging band and having their opposite ends disposed through the perforated lugs to form hinges between the sections of the outer bands, and a tread member mounted on the outer rim.

In testimony whereof, I affix my signature, in presence of two witnesses.

EDWIN A. HOWE.

Witnesses:
 C. M. C. WALTERS,
 JAS. ALLSON.

L. HYVE.
SELF ACTING CONVEYER FOR COAL AND GOAF PACKING IN COLLIERY INCLINES OF LOW GRADIENT.
APPLICATION FILED OCT. 15, 1912.
1,079,176.
Patented Nov. 18, 1913.
3 SHEETS—SHEET 3.
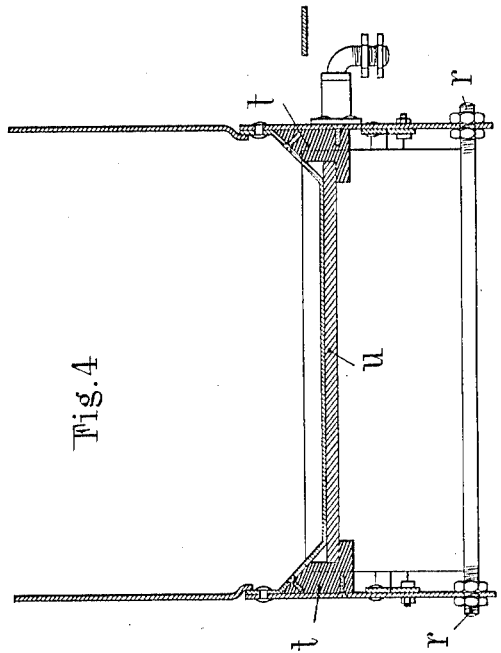
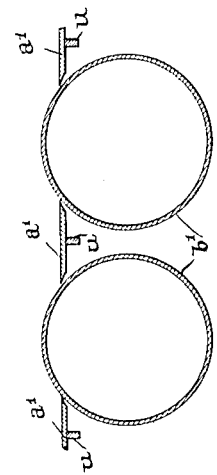
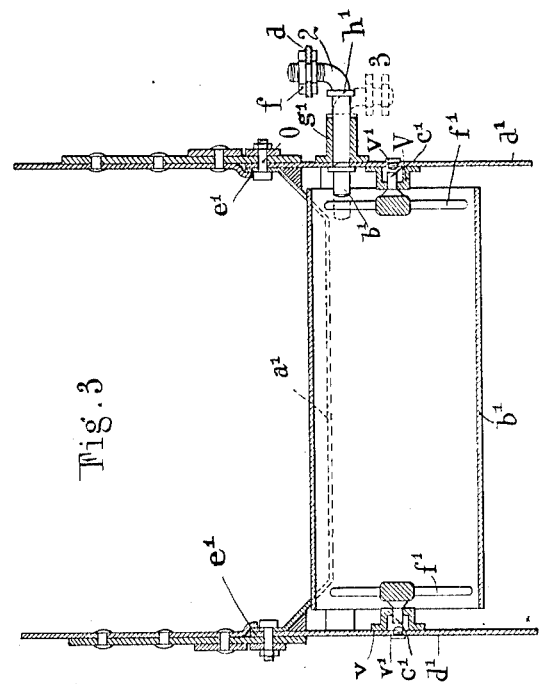
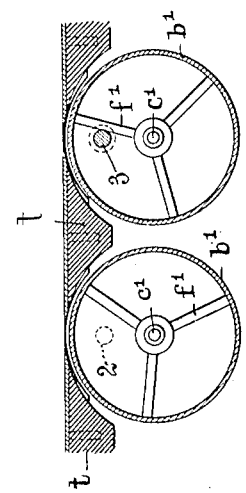
Witnesses
John H. Hoving
Frank H. Logan
Inventor
Louis Hyve
By H. van Dedemsael
Attorney

UNITED STATES PATENT OFFICE.

LOUIS HYVE, OF DORIGNIES, NEAR DOUAI, FRANCE.

SELF-ACTING CONVEYER FOR COAL AND GOAF-PACKING IN COLLIERY-INCLINES OF LOW GRADIENT.

1,079,176.   Specification of Letters Patent.   Patented Nov. 18, 1913.

Application filed October 15, 1912. Serial No. 725,851.

*To all whom it may concern:*

Be it known that I, LOUIS HYVE, a citizen of the French Republic, residing at Escarpelle Mines, Dorignies, near Douai, (Nord,) France, have invented certain new and useful Improvements in Self-Acting Conveyers for Coal and Goaf-Packing in Colliery-Inclines of Low Gradient, of which the following is a specification.

This invention relates to the conveyance of coal, rubble and the like, and has for its object to provide an economical and efficient apparatus for conveying coal or the like along the sloping coal faces of thin seams of low gradient. It is particularly adapted for long wall cuttings.

The apparatus consists of a series of troughs which may be one meter in length and of the construction described hereinafter.

In the accompanying drawing, Figure 1 is a side elevation, partly in section, of one length or section of the apparatus, Fig. 2 is a plan view, partly in horizontal section; Fig. 3 is a vertical sectional view taken on the line A—A of Fig. 1; Fig. 4 is a vertical sectional view taken on the line B—B of Fig. 1; Fig. 5 shows a vertical section on the line C—C of Fig. 2, and Fig. 6 shows a vertical section on the line D—D of Fig. 2.

The apparatus is composed of a series of chutes the floor of which is composed of flat parts $a'$ between which project the upper part of adjacent rollers $b'$. The flat parts $a'$ are cut beveled on their lateral edges adjacent to the rollers. The floors of the chutes are connected end to end by the beveled edges $a$, $b$ and the sides are connected by projections $c$ (Figs. 1 and 2).

The whole apparatus forms a regular series of flat parts $a'$ and of rollers $b'$ mounted on shafts $c'$ engaged in the bearings $v$, carried by the lower prolongations $d'$ of the sides $e'$ of the chutes. Near the ends of the shafts $c'$ are provided lubricating holes closed by screws $b'$. The flat parts $a'$ are sustained by iron reglets $u$ the ends of which are incased in the oak brackets $t$ (Figs. 1, 4). The sheet-iron floor and sideplates of the chutes are kept rigid by means of screw tie-rods $q$, $r$, $s$, and the brackets $t$, which almost conform to the shape of the rollers $b'$. The shafts $c'$ are rigid with hubs mounted thereon which are connected to the inner faces of the rollers $b'$ by arms $f'$ which also serve to immobilize the desired rollers by the manipulation of the bolts 1, 2, 3, 4 which can be engaged between the arms as shown by the dotted lines of Fig. 3. These bolts 1, 2, etc. are slidable longitudinally and rotatable in ferrules $g'$ rigid with the side plates $d'$. The path of the sliding is limited in opposite directions by flanges $h'$ fixed on the bolts. The outer part of these bolts is bent at a right angle and threaded at $f$ so as to be capable of being fastened or not to the bars $d\ e$, that are manipulated to free or to stop simultaneously all the rollers the bolts of which are connected to these bars. The rollers $b'$, which are disengaged, turn under the weight of the coal and force the sliding on the flat parts $a'$.

When desired the apparatus can give:

1. A continuous flow corresponding to a continuous loading, by a permanent disengagement of a certain number of rollers $b'$, which is applicable to rising cuts. The disengagement of the rollers $b'$ is effected by drawing out the corresponding bolts 1, 2, 3, as shown by full lines in Fig. 3.

2. An intermittent flow of the contents of the chute, by simultaneous disengagement of a determined number of rollers $b'$, which permit a rapid loading into cars at the bottom of the cut. In this case the apparatus is provided, to accelerate the manipulation, with rods $d\ e$ pierced with elongated openings $i'$ permitting the engagement of the threaded part $f$ of the corresponding bolts with the rollers $b'$ before being liberated together.

All the bars $d\ e$ of a series of three chutes, corresponding to a worker's position, can be connected by means of clamping screws $g$. In Fig. 2 the bolts 1 and 2 only are connected to the bar $d\ e$, the corresponding rollers $b'$ being disengaged; the others can be manipulated separately and they are shown in inner position in the sleeves $g'$, which corresponds to the position of disengagement of the corresponding rollers. To engage the rollers with the bolts 1, 2, the bar $d\ e$ is pushed in the direction of the arrow $j'$ (Fig. 2). At command all the workers of the cut can operate their respective rods (in the direction of the arrow $k$, Fig. 2) to disengage the rollers the bolts of which are connected to this rod and cause the descending movement.

The apparatus bounded by the lines $h$, $i$, $j, k, l$ (Fig. 1) is applied to seams of coal with an opening of 0.40 meter, that is to say the smallest worked. For thicker seams the apparatus is provided with sides $l, m, n, h$, of a height variable with the opening of the seam and fixed by means of bolts and pins $o\ p$, (Figs. 1 and 3).

In operation, a practical precaution is first to load the larger lumps on the base of the chute and the smaller on top. Cut-away places $i, j, k$, arranged at the base of the prolongations $d'$, permit the easy withdrawal of the small particles which may pass beneath the floor. Each chute is provided with two handles $l'$ at each end. In a rising cut, the manipulation of the additional chutes is effected by means of a small wheeled truck carrying the chute and for rails using the upper edges $l, h$ (Fig. 1) of the chutes already in position.

I claim:

1. In automatic chutes for conveying coal and the like in slightly sloping cuts, the combination of a series of closely placed rollers having their axes disposed in substantially the same plane; flat strips between said rollers and having beveled edges almost in contact with the rollers, said rollers projecting above the strips a very small distance relative to the length of the radius of the rollers; and means for at will holding certain of the rollers stationary.

2. In automatic chutes for conveying coal and the like in slightly sloping cuts, the combination of a series of closely placed rollers having their axes disposed in substantially the same plane; flat strips between said rollers and having beveled edges almost in contact with the rollers, said rollers projecting above the strips a very small distance relative to the length of the radius of the rollers; and means for at will holding certain of the rollers stationary, said means comprising slidable bolts adapted to engage the rollers.

3. In automatic chutes for conveying coal and the like in slightly sloping cuts, the combination of a series of closely placed rollers having their axes disposed in substantially the same plane; flat strips between said rollers and having beveled edges almost in contact with the rollers, said rollers projecting above the strips a very small distance relative to the length of the radius of the rollers; means for at will holding certain of the rollers stationary, said means comprising slidable bolts adapted to engage the rollers and means for simultaneously operating a plurality of the bolts.

In testimony whereof I have affixed my signature, in presence of two witnesses.

LOUIS HYVE.

Witnesses:
DANIEL GARD,
ALFRED C. HARRISON.

Copies of this patent may be obtained for five cents each, by addressing the "Commissioner of Patents, Washington, D. C."